US011847247B2

(12) United States Patent
Sehgal et al.

(10) Patent No.: US 11,847,247 B2
(45) Date of Patent: *Dec. 19, 2023

(54) ANONYMIZING USER DATA PROVIDED FOR SERVER-SIDE OPERATIONS

(71) Applicant: Apple Inc., Cupertino, CA (US)

(72) Inventors: Vivek Sehgal, Santa Clara, CA (US); Lun Cui, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 16/890,932

(22) Filed: Jun. 2, 2020

(65) Prior Publication Data

US 2020/0293691 A1    Sep. 17, 2020

Related U.S. Application Data

(63) Continuation of application No. 15/721,692, filed on Sep. 29, 2017, now Pat. No. 10,671,759.

(60) Provisional application No. 62/514,755, filed on Jun. 2, 2017.

(51) Int. Cl.
*G06F 21/62*    (2013.01)
*G06F 16/28*    (2019.01)
*G06F 16/2457*    (2019.01)
*G06F 16/242*    (2019.01)
*G06F 16/955*    (2019.01)

(52) U.S. Cl.
CPC ........ *G06F 21/6254* (2013.01); *G06F 16/242* (2019.01); *G06F 16/24578* (2019.01); *G06F 16/284* (2019.01); *G06F 21/6227* (2013.01); *G06F 16/955* (2019.01)

(58) Field of Classification Search
CPC ............... G06F 21/6254; G06F 16/242; G06F 16/24578; G06F 16/284; G06F 21/6227; G06F 16/955
See application file for complete search history.

(56) References Cited

U.S. PATENT DOCUMENTS 10,255,283 B1    4/2019  Cheng
10,268,762 B1 *  4/2019  Ledet ................. G06F 16/3325
2005/0108200 A1  5/2005  Meik
(Continued)

FOREIGN PATENT DOCUMENTS

WO    WO 2016/000251    1/2016

*Primary Examiner* — Mohammad W Reza
(74) *Attorney, Agent, or Firm* — BAKERHOSTETLER

(57) ABSTRACT

A device implementing a system for anonymizing user data provided for server-side operations includes a processor configured to receive user input including a search term, wherein first and second data structures are stored on the device, the first data structure including user interest data items that correspond to prior user activity, the second data structure including topic data items mapped to the user interest data items, the topic data items being broader than the user interest data items. The processor accesses the second data structure to obtain one or more topic data items. The processor transmits, to a server, the search term and one or more topic data items for obtaining a query suggestion or search result. The processor receives, from the server, the query suggestion or search result, the query suggestion or search result having been obtained based on the search term and one or more topic data items.

20 Claims, 7 Drawing Sheets

(56) References Cited

U.S. PATENT DOCUMENTS

| | | | |
|---|---|---|---|
| 2008/0033922 A1 | 2/2008 | Cisler et al. | |
| 2010/0223133 A1 | 9/2010 | Scott et al. | |
| 2013/0073543 A1* | 3/2013 | Nuzzi | G06F 16/22 |
| | | | 707/723 |
| 2013/0110823 A1* | 5/2013 | Su | G06F 16/9535 |
| | | | 707/723 |
| 2013/0268538 A1* | 10/2013 | Nelson | G06F 16/328 |
| | | | 707/741 |
| 2014/0040301 A1* | 2/2014 | Chadha | G06F 16/9535 |
| | | | 707/765 |
| 2014/0129586 A1* | 5/2014 | Kritt | G06F 16/972 |
| | | | 707/769 |
| 2016/0350383 A1 | 12/2016 | Lim et al. | |
| 2018/0101614 A1* | 4/2018 | Kuipers | G06Q 50/01 |

\* cited by examiner

ANONYMIZING USER DATA PROVIDED FOR SERVER-SIDE OPERATIONS

CROSS-REFERENCE TO RELATED APPLICATIONS

The present application is a continuation of U.S. patent application Ser. No. 15/721,692, entitled "ANONYMIZING USER DATA PROVIDED FOR SERVER-SIDE OPERATIONS," filed on Sep. 29, 2017, which claims the benefit of U.S. Provisional Patent Application Ser. No. 62/514,755, entitled "ANONYMIZING USER DATA PROVIDED FOR SERVER-SIDE OPERATIONS," filed Jun. 2, 2017, each of which is hereby incorporated herein by reference in its entirety and made part of the present U.S. Utility patent application for all purposes.

TECHNICAL FIELD

The present description relates generally to anonymizing user data, including anonymizing user interest data provided for server-side operations.

BACKGROUND

Electronic devices such as laptops, mobile phones, computers and mobile media devices can run applications for performing server-based searches. A user can input a search term within such an application, and request a server to perform a search on the search term. The server may then provide one or more search results that are retrieved based on the search term.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
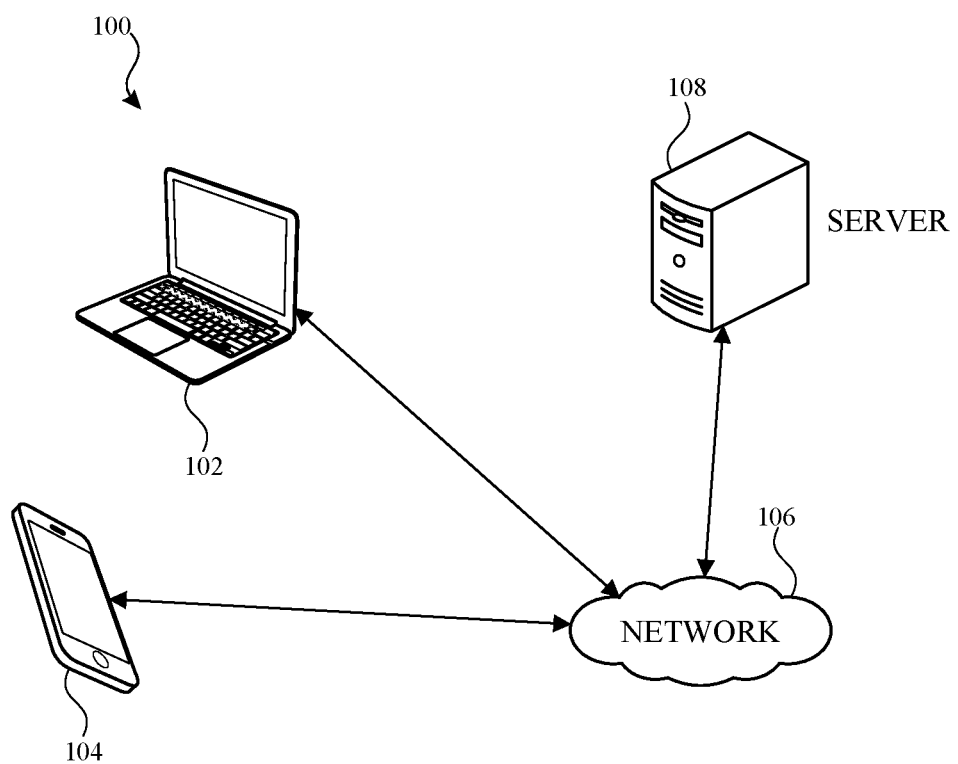
FIG. 1 illustrates an example network environment for anonymizing user data provided for server-side operations in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A server providing search results and/or query suggestions to a user may be able to provide more relevant search results and/or query suggestions when the server has access to information regarding the user. For example, the server may be able to provide the more relevant search results or query suggestions (e.g., keyboard suggestions) within a browser application, a desktop search application, or an intelligent personal assistant application (e.g., with voice recognition, speech, and proactive capabilities). However, in order to ensure user privacy it may not be desirable to transmit user identifying to a server, or storing such information on a server.

In the subject system, user interest data is stored locally on a user's device, and is not transmitted or stored on a server. For example, the user interest data may be derived from prior user activity on the device. The user interest data may be mapped to broad topics that are of interest to the user and may also be stored locally on the user's device (without being stored on the server). In one or more implementations, a "broad" topic is one which encompasses the user interest data, but is more generic such that no individual user may be identifiable based on having an interest in any given topic or set of topics. When the user inputs a search term, or begins to input a search term, the user's device transmits the search term (or partial search term) to the server along with one or more of the broad topics that are derived from the user interest data. The server may then use the one or more broad topics to retrieve search results and/or query suggestions (e.g., keyboard suggestions) that may be relevant to the user.

By providing the server with the search term (or partial search term) in conjunction with one or more broad topics, the server may be able to retrieve search results and/or query suggestions that are more relevant to the user than those that would be retrievable based on the search term (or partial search term) alone. Furthermore, since the only information provided to the server regarding the user is the one or more broad topics, the user cannot be individually identified from the information provided to the server. Accordingly, the subject system enables a server to provide information that is relevant to a user without receiving any information from which the user can be individually identified.

FIG. 1 illustrates an example network environment 100 for anonymizing user data provided for server-side operations in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 104 (hereinafter 102-104), and a server 108. The network 106 may communicatively (directly or indirectly)

couple, for example, any two or more of the electronic devices 102-104 and/or the server 108. In one or more implementations, the network 106 may be an interconnected network of devices that may include, or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

One or more of the electronic devices 102-104 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a laptop computer, and the electronic device 104 is depicted as a smartphone. Each of electronic devices 102-104 may be, and/or may include all or part of, the electronic device discussed below with respect to FIG. 2, and/or the electronic system discussed below with respect to FIG. 7.

The server 108 may be, and/or may include all or part of the electronic system discussed below with respect to FIG. 7. The server 108 may include one or more servers, such as a cloud of servers, that may be used in a system for anonymizing user interest data for server-side operations. For example, a user may input a search term within an application running on one of the electronic devices 102-104, such as the electronic device 102. The electronic device 102 may send the search term together with anonymized user interest data to the server 108. The anonymized user interest data may include, for example, one or more broad topics from which an individual user is not identifiable. The server 108 may perform the search based on the search term and the anonymized user interest data, and return search results and/or query suggestions (e.g., keyboard suggestions) to the electronic device 102. In this way, a server-based search can be performed using a broader representation the user interests, without the server 108 having access to more specific user interest data that can be used to identify the user.

Figure 2:
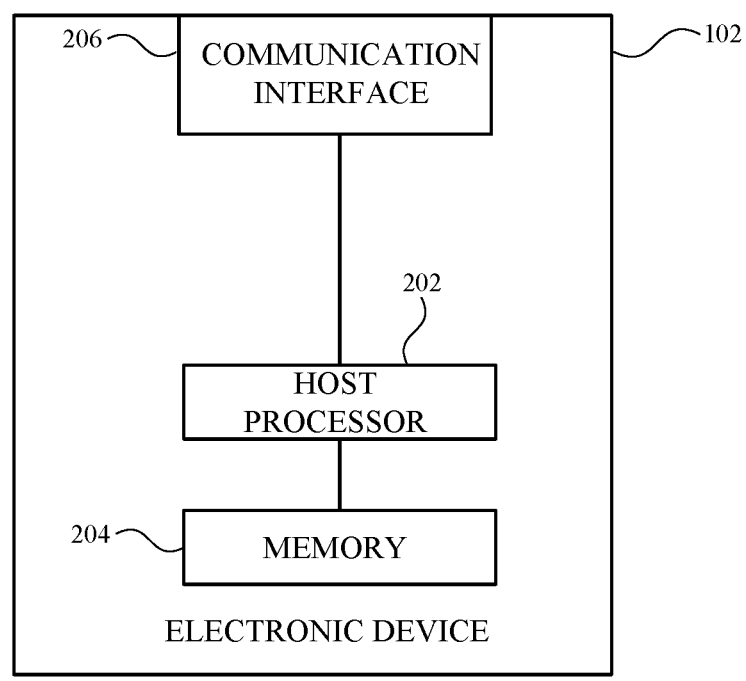
FIG. 2 illustrates an example electronic device that may implement a system for anonymizing user data provided for server-side operations in accordance with one or more implementations.

FIG. 2 illustrates an example electronic device 102 that may implement a system for anonymizing user data provided for server-side operations in accordance with one or more implementations. For example, electronic device 102 can correspond to any of the electronic devices 102-104 from FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, and a communication interface 206. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. In the subject system, the host processor 202 may implement the software architecture for anonymizing user interest data that is discussed further below with respect to FIG. 3.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store a user interest database (or generally any data structure) which includes user interest data items that correspond to prior user activity on the electronic device. The memory 204 may also store a topic database (or generally any data structure) which includes topic data items derived from the user interest data items, the topic data items being broader than the user interest data items. In one or more implementations, plural user interest data items are mapped to a single topic data item. The memory 204 may also store a mapping and ranking data structure which facilitates the mapping of topic data items to user interest data items, and which includes ranking information for the topic data items.

The communication interface 206 may include suitable logic, circuitry, and/or code that enables wired or wireless communication, such as between any of the electronic devices 102-104 and server 108 over the network 106. The communication interface 206 may include, for example, one or more of a Bluetooth communication interface, an NFC interface, a Zigbee communication interface, a WLAN communication interface, a USB communication interface, or generally any communication interface. The communication interface 206 may be used to transmit search terms, partial search terms, and/or topic data item(s) to the server 108, and to receive query/completion suggestions, search results, and/or topic data item(s) from the server 108.

In one or more implementations, one or more of the host processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
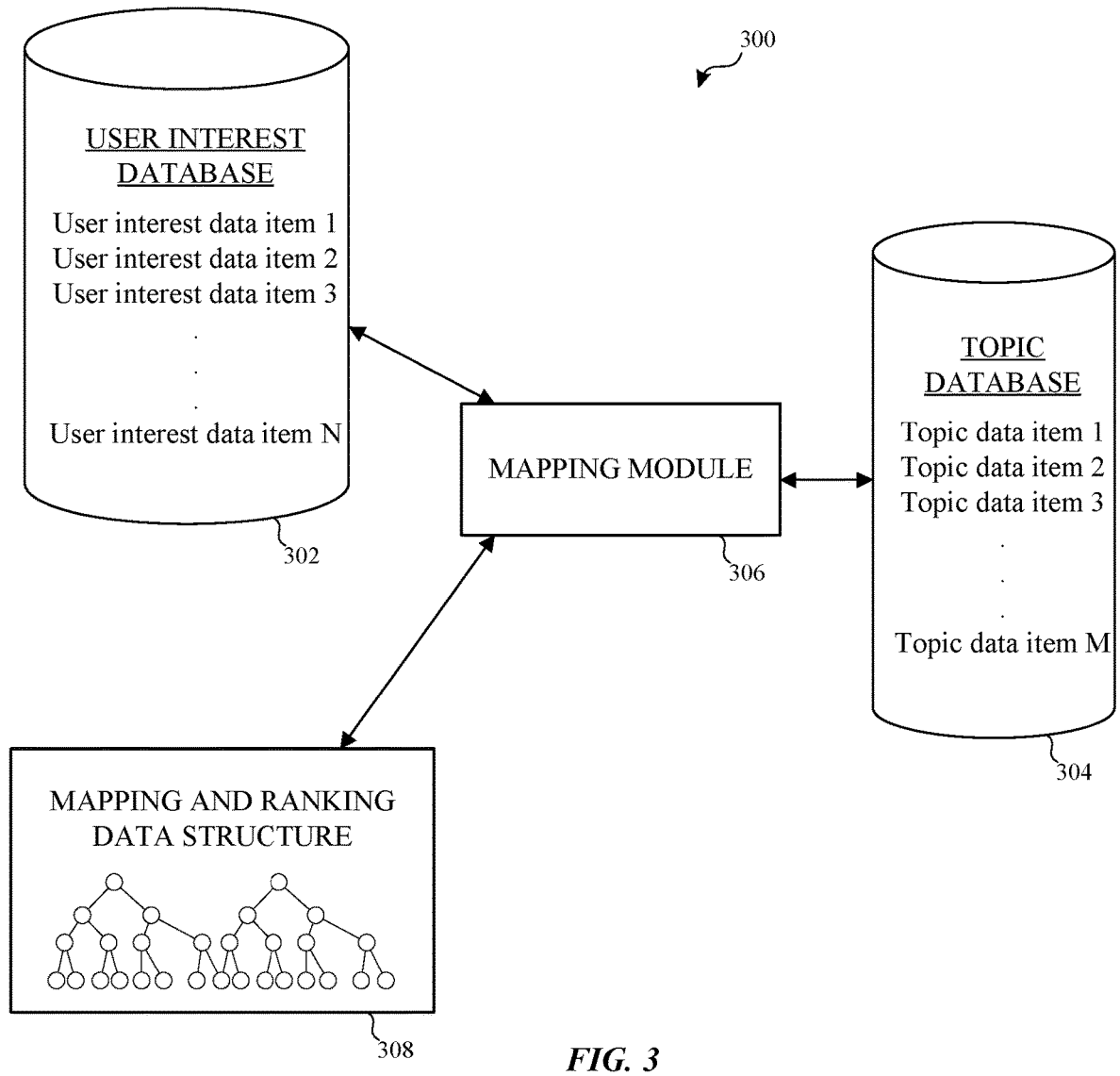
FIG. 3 illustrates an example software architecture of a system for anonymizing user data provided for server-side operations in accordance with one or more implementations.

FIG. 3 illustrates an example software architecture 300 of a system for anonymizing user data provided for server-side operations in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, the software architecture 300 may be locally implemented by one or more of the electronic devices 102-104 to provide a system for anonymizing user data provided for server-side operations.

The software architecture 300 includes user interest database 302, topic database 304, mapping module 306 and mapping and ranking data structure 308. In one or more implementations, the user interest database 302 includes user interest data items 1, 2, 3, . . . N (hereinafter 1-N), which are locally stored within memory 204 and correspond to interests of the user. These interests can be based on, for example, prior user interaction with content presented on applications running on one or more of the electronic devices 102-104, such as the electronic device 102. In one or more implementations, the user interest data items are not provided to any servers, such as the server 108, and are only stored locally on the electronic devices 102-104, such as in the memory 204.

For example, the user may have searched for the programming language "python," using a browser application running on the electronic device 102. In addition, the user may have bookmarked (or saved as a "favorite") a news article about the "python" programming language on a news application running on the electronic device 102. Based on the user activity with the content relating to "python," the electronic device 102 may determine that the programming language "python" is an interest of the user. The electronic device 102 may therefore store information corresponding to the python programming language as one or more user interest data items within user interest database 302.

In one or more implementations, content corresponding to a user interest may be defined as one or more topics that are stored in the user interest database 302. In this regard, a topic may be a data item that is associated with an entry in a structured data source, such as a data item that has an entry in an encyclopedia or an online encyclopedia, e.g., Wikipedia. For example, the topic can be a specific programming language, a sports team, a musician, a song, or the like. Thus, the user interest data items (e.g., 1-N) are stored and/or updated in the user interest database 302 as the user interacts with content on an application.

Alternatively, or in addition, the content corresponding to a user interest may be defined as one or more entities that are stored in the user interest database 302. An entity may relate to one or more concepts, but may be more generic and less restrictive than a topic for identifying a concept (e.g., a noun, place or thing). While there may be some overlap between entities and topics, some entities may not be associated with an entry in a structured data source, such as an online encyclopedia. For example, a sports team can correspond to both an entity and a topic, e.g., associated with an entry in an online encyclopedia, whereas the name of a user's pet may correspond to an entity but not a topic, since the name of the user's pet may not be associated with an entry in a structured data source, such as an online encyclopedia.

The user interest data items 1-N stored locally with memory 204 may be considered private information, as the user may be identifiable from one or more of the user interest data items 1-N. Thus, to anonymize user data when conducting a search, the user interest data items 1-N are not sent or otherwise accessed by the server 108 as part of the search request.

In this regard, the software architecture 300 also includes the topic database 304. The topic database includes topic data items 1, 2, 3, . . . M (hereinafter 1-M) which are derived from the user interest data items 1-N. In one or more implementations, multiple user interest data items of the user interest data items 1-N are mapped to a single topic data item of the topic data items 1-M. Thus, the topic data items 1-M correspond to topics and/or entities that are broader than the topics and/or entities corresponding to the user interest data items 1-N. By virtue of being broader, the topic data items 1-M may anonymize the user by broadening the user's interests to a level where the user's interests are shared with a large number of other users. Accordingly, the topic data items 1-M can be sent from the electronic device 102 together with search terms to the server 108, without providing the server 108 access to user-identifiable information, such as the user interest data items 1-N.

In one or more implementations, the mapping module 306 facilitates the mapping of the user interest data items 1-N to the topic data items 1-M. The mapping module 306 may access the mapping and ranking data structure 308 in order to map the user interest data items 1-N to the topic data items 1-M. For example, the mapping and ranking data structure 308 may correspond to a tree structure in which specific topics and/or entities (e.g., corresponding to all known user interest data items for all users) are child nodes that are mapped to parent nodes corresponding to broader topics and/or entities. In some instances, the parent nodes corresponding to these broader topics and/or entities are mapped to grandparent nodes corresponding to even broader topics and/or entities.

For example, the user may be interested in the "python" programming language, and have a corresponding user interest data item stored within the user interest database 302. The user interest data item "python" may be mapped to a topic data item of "programming." The user interest data item "python" may also be mapped to a topic data item of "reptile," which in turn is mapped to a topic data item of "animal." The mapping of all known topics and/or entities may be generated and stored as a data structure (e.g., the mapping and ranking data structure 308) on a server, for example, server 108 or a separate server.

In one or more implementations, the mapping may be based on offline experiments performed via separate applications that map all known topics and/or entities to broader topics and/or entities. The offline experiments can facilitate in determining which topic data items are broad enough to anonymize the specific interests of user(s). For example, if the topic data item at one node of the above-described tree structure corresponds to a user interest shared by at least a threshold number of users, it may qualify as a topic data item which is broad enough for sending to the server 108. Otherwise, a broader topic data item which is mapped to that topic data item and exceeds the threshold may be used as the topic data item for sending to the server 108.

In addition, the mapping module 306 facilitates in ranking of the topic data items 1-M. The mapping module 306 may access the mapping and ranking data structure 308 in order to rank the topic data items 1-M. The mapping and ranking data structure 308 may store ranking data, such as a ranking score, for all known topic data items (e.g., all topic data items appearing within the tree structure). The ranking may also be based on offline experiments which are performed, for example, via the above-mentioned separate applications. The offline experiments can facilitate in ranking the topic data items based on an expected impact of each topic data item to obtain relevant search results. In one or more implementations, the ranking may be performed using a machine learning model trained with information generated from the offline experiments.

The mapping and ranking data structure 308 may be transmitted to each of the electronic devices 102-104 for locally storing within the memory 204 of the electronic devices 102-104. The transmitted mapping and ranking data structure 308 may be separate from the mapping module 306, as shown in FIG. 3. Alternatively, the mapping and ranking data structure 308 may be integrated within the mapping module 306, in order to effect the mapping of user interest data items 1-N to topic data items 1-M and rankings. In addition, the server 108 may store its own copy of the mapping and ranking data structure 308.

As noted above, the use of topic data items 1-M in association with search queries may assist in personalizing search results for a user while maintaining privacy. By coupling search terms with topic data item(s), it is possible for the server 108 to perform a search based topics and/or entities that relate to interests of the user, without providing the server 108 with interests specific enough to identify the user. In this way, anonymity of the user is maintained.

In one or more implementations, the user interest database 302, the topic database 304, and the mapping and ranking data structure 308 are stored in the memory 204. In one or more implementations, the mapping module 306 is implemented as software instructions, stored in the memory 204, which when executed by the host processor 202, cause the host processor 202 to perform particular function(s).

In one or more implementations, the mapping module 306 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
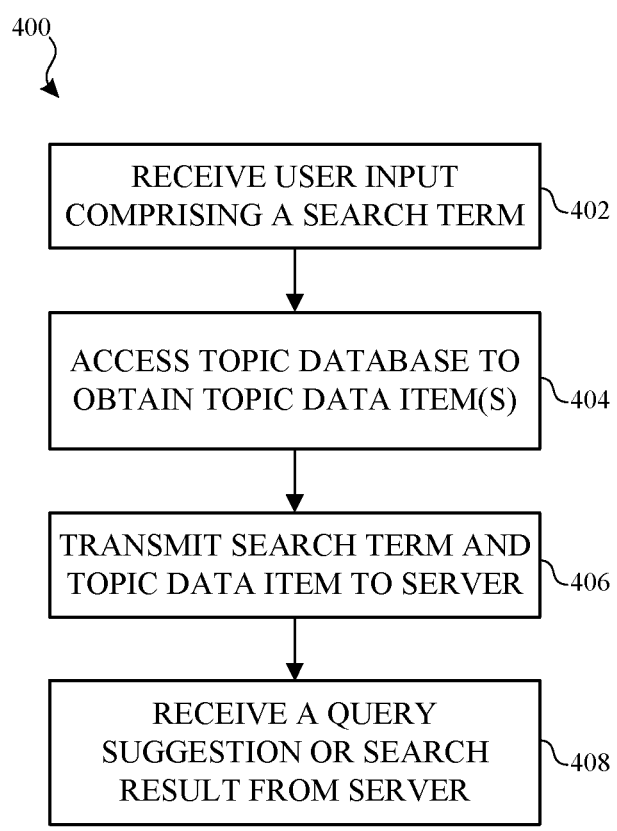
FIG. 4 illustrates a flow diagram of an example process for anonymizing user data provided to a server for a search request in accordance with one or more implementations.

FIG. 4 illustrates a flow diagram of an example process 400 for anonymizing user data provided to a server for a search request in accordance with one or more implementations. For explanatory purposes, the process 400 is primarily described herein with reference to the electronic device 102 of FIG. 1. However, the process 400 is not limited to the electronic device 102 of FIG. 1, and one or more blocks (or operations) of the process 400 may be performed by one or more other components of the electronic device 102 and/or by other suitable devices (e.g., the server 108, the electronic device 104). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 receives user input comprising a search term (402). For example, the user may enter the term "python" within a search interface. In one or more implementations, the input search term can be received within a browser application, a desktop search application, an intelligent personal assistant application (e.g., with voice recognition, speech, and proactive capabilities), or generally any application running on the electronic device 102.

In response to receiving the user input, the electronic device 102 accesses the topic database 304 to obtain one or more topic data items (404). As described above, the electronic device 102 stores the user interest database 302 and the topic database 304. The user interest database 302 includes the user interest data items 1-N corresponding to prior user activity, and the topic database 304 includes topic data items 1-M mapped to, and broader than, the user interest data items 1-N. The mapping of the topic data items 1-M to the user interest data items 1-N is predefined, and may be facilitated by the mapping module 306.

The prior user activity corresponding to the user interest data items 1-N may correspond to, for example, prior user interactions with a plurality of applications on the electronic device 102. The user interest database 302 may be continuously updated based on subsequent user interactions.

Alternatively, or in addition, the prior user activity corresponding to the user interest data items 1-N may correspond to prior user interactions with a plurality of applications on the electronic device 102 and on other electronic device(s) (e.g., the electronic device 104). The electronic device 102 and the other electronic device(s) (e.g., the electronic device 104) may be associated with a same user account. In this regard, the prior user interactions may be synchronized across the electronic devices 102-104, such that the respective user interest data items 1-N at each device accounts for user activity occurring on devices associated with the user account. The user interest database 302 on each of the electronic devices 102-104 may be continuously updated based on subsequent user interactions, and the subsequent user interactions are synchronized across the electronic devices 102-104.

In determining which topic data items are broad enough for anonymizing the specific interests of a user, the mapping module 306 may reference the mapping and ranking data structure 308, e.g., a tree structure with topic data items as nodes. Each node represents a topic and/or entity corresponding to a user interest. If the topic data item at one node corresponds to a user interest shared by at least a threshold number of users, it may qualify as a topic data item for sending to the server 108. Otherwise, a broader topic data item which is derived from and mapped to that topic data item and exceeds the threshold may be used as the topic data item for sending to the server 108.

When obtaining the one or more topic data items from the topic database 304, the electronic device 102 may select the one or more topic data items based on a predefined ranking of the topic data items 1-M. As noted above, the mapping and ranking of the topic data items 1-M may be based on offline experiments performed via separate applications that map specific topics and/or entities to more general topics and/or entities, and that rank the topic data items 1-M based on an expected impact of each of the topic data items on obtaining relevant search results.

By way of non-limiting example, the electronic device 102 may obtain the topic data items of "programming" and "art" from the topic database 304. "Programming" and "art" are topics and/or entities that are broader than specific interests corresponding to user interest data items 1-N. For example, user interest data items 1-N may include user interest data items for C++ programming and python programming (both of which map to the broader topic of "programming") as well as user interest data items for ceramics and sculpture (both of which map to the broader topic of "art").

After obtaining the one or more topic data items, the electronic device 102 transmits, to the server 108, the search term and the topic data item(s) (e.g., "programming" and "art") for obtaining at least one of a query suggestion (e.g., keyboard suggestions) or a search result (406). The server 108 then obtains at least one of a query suggestion or a search result using the one or more topic data items. The electronic device 102 then receives, from the server 108, the at least one of the query suggestion or the search result (408).

For example, if the user input was a complete entry of the search term (as opposed to a partial entry of the search term), the electronic device 102 may receive a ranked list of search results from the server 108. The received search results may be based on the search term and the one or more topic data items.

Using the example of "python" as the search term, the received search results may be at least partially based on the topic data item "programming" that was sent to the server 108, as opposed to search results related to snakes or reptiles. As such, the list of search results returned by server for the search term "python" may rank programming search results higher than snake or reptile search results.

In another example, if the user input was a partial search term (where the user did not complete entry of the entire search term), the electronic device 102 may receive a query suggestion (e.g., keyboard suggestion) from the server 108, the query suggestion corresponding to a completion suggestion for the partial search term. The received query suggestion may be based on the partial search term and the one or more topic data items.

For example, the user may have started by entering the prefix "py" for inputting the term "python." In generating a list of completion suggestions, the server 108 may rank the suggestion "python" higher than "pyramid" (both terms having the prefix "py"), since "python" corresponds to one of the topic data items ("programming"), while "pyramid" may not correspond to either of the topic data items of "programming" or "art" as provided by the electronic device 102.

Moreover, while the electronic device 102 may have sent the topic data items "programming" and "art" to the server 108, it did not send the more specific user interests of C++ programming, python programming, ceramics and/or sculpture to the server 108. Thus, by coupling the search term (or partial search term) with the one or more topic data items, the received search results and/or completion suggestions may more closely relate to interests of the user, while also maintaining user anonymity.

Figure 5:
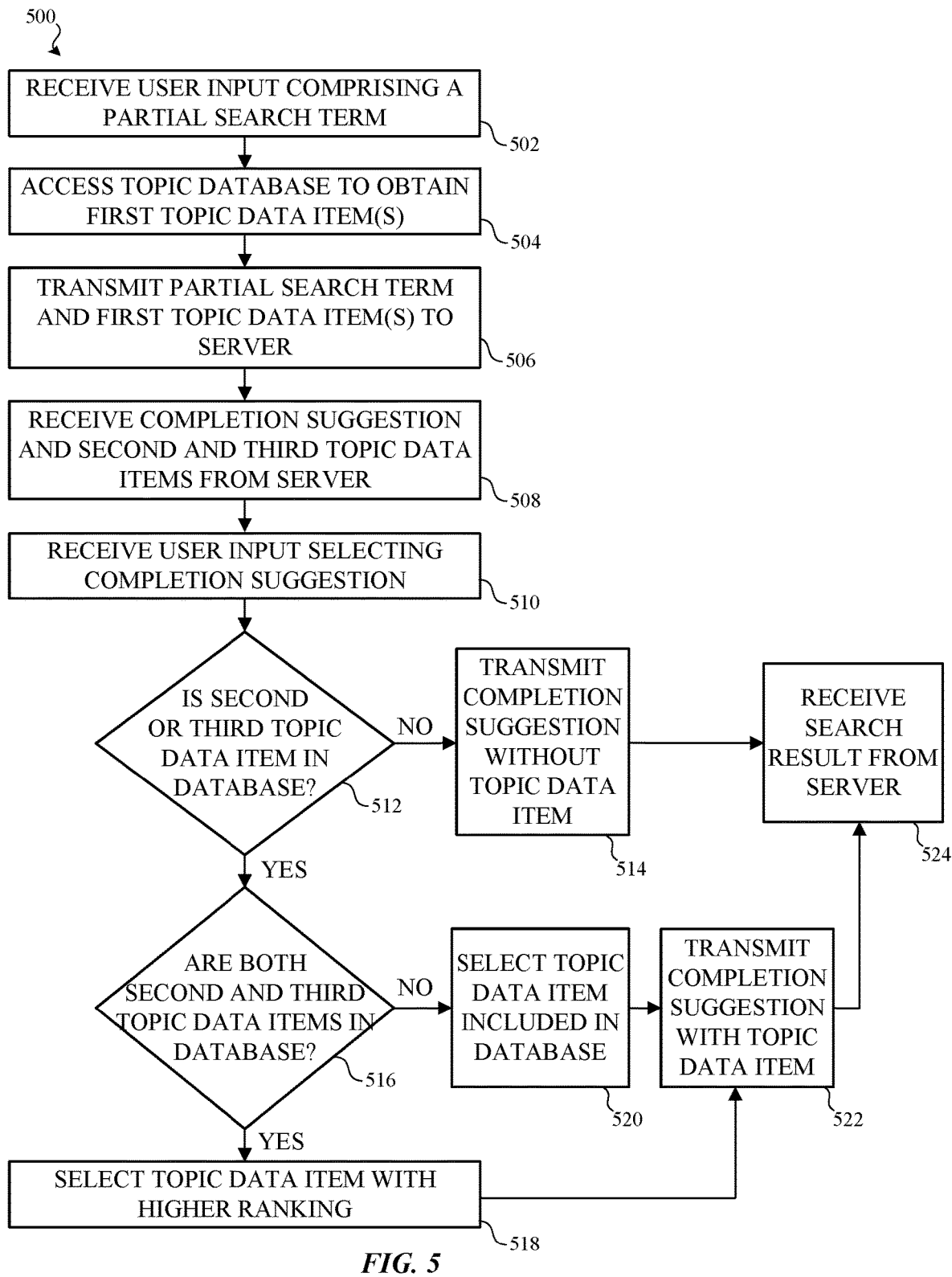
FIG. 5 illustrates a flow diagram of an example process for anonymizing user data provided to a server for a query suggestion in accordance with one or more implementations.

FIG. 5 illustrates a flow diagram of an example process 500 for anonymizing user data provided to a server for a query suggestion in accordance with one or more implementations. For explanatory purposes, the process 500 is primarily described herein with reference to the electronic device 102 of FIG. 1. However, the process 500 is not limited to the electronic device 102 of FIG. 1, and one or more blocks (or operations) of the process 500 may be performed by one or more other components of the electronic device 102 and/or by other suitable devices (e.g., the electronic device 104 or other electronic devices). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The electronic device 102 receives user input comprising a partial search term, where the user did not complete entry of the entire search term (502). For example, the user may start by entering the prefix "py" while inputting the term "python" within a search interface. In one or more implementations, the partial search term can be received within a browser application, a desktop search application or an intelligent personal assistant application (e.g., with voice recognition, speech, and proactive capabilities) running on the electronic device 102.

In response to receiving the partial search term, the electronic device 102 accesses the topic database 304 to obtain one or more topic data items, hereinafter "first topic data item(s)" (504). As described above, the electronic device 102 stores the user interest database 302 and the topic database 304. The user interest database 302 includes the user interest data items 1-N corresponding to prior user activity, and the topic database 304 includes topic data items 1-M mapped to, and broader than, the user interest data items 1-N. The mapping of the topic data items 1-M to the user interest data items 1-N is predefined, and may be facilitated by the mapping module 306.

When obtaining the first topic data item(s) from the topic database 304, the electronic device 102 may select the first topic data item(s) based on a predefined ranking of the topic data items 1-M. As noted above, the mapping and ranking of the topic data items 1-M may be based on offline experiments performed via separate applications that map specific topics and/or entities to more general topics and/or entities, and that rank the topic data items 1-M based on an expected impact of each of the topic data items on obtaining relevant search results, or an expected amount that each of the topic data items may boost or improve one or more searching metrics, such as click-throughs, conversions, and the like.

By way of non-limiting example, the electronic device 102 may retrieve the top two topic data items from the topic database 304, which may be "sports" and "art." After obtaining the first topic data item(s), the electronic device 102 transmits, to the server 108, the partial search term and the first topic data item(s) for, obtaining a completion suggestion from the server 108 (506). Since "sports" and "art" are topics and/or entities that are broader than specific interests corresponding to user interest data items 1-N, the user's anonymity is maintained.

As noted above, the server 108 may store its own copy of the mapping and ranking data structure 308. The server 108 can determine the completion suggestion based on the partial search term and the first topic data item(s) when one or more of the first topic data item(s) corresponds to a completion suggestion. For example, the server 108 may traverse through the tree structure to determine a topic and/or entity, to be used as the completion suggestion, the prefix of which matches the partial search term. Using the example of the partial search term "py," the server 108 would rank the completion suggestion of "python" higher than "pyramid," when the first topic data item(s) includes the topic data item of "programming." However, since in this example the first topic data item(s) does not include "programming," the server may choose completion suggestions without referring to the first topic data item(s).

The server 108 may further traverse the tree structure to select one or more topic data items (hereinafter "second and third topic data items") based on the topic and/or entity corresponding to the completion suggestion that is being provided. For example, the server 108 selects, based on node connections of the topic and/or entity corresponding to the completion suggestion, the second and third topic data items. For example, the completion suggestion of "python" and the topic of "programming" may be connected as nodes within the tree structure. In addition, "python" and the topic of "animals" (or "reptiles") may be connected as nodes within the tree structure. Thus, the server 108 may select the topics of "programming" and "animals" as the second and third topic data items, based on the node connections within the tree structure. In one or more implementations, one or more of the second and third topic data items may overlap with one or more of the first topic data item(s).

The electronic device 102 then receives, from the server 108, the completion suggestion together with the second and third topic data items (508). While FIG. 5 is described herein with reference to one completion suggestion, it is understood that the server 108 may determine multiple completion suggestions for the partial search term (e.g., "python" and "pyramid" for the partial search term "py,"), and then send electronic device 102 a list of the multiple completion suggestions. Each of the multiple completion suggestions may be associated with one or more respective second and third topic data items.

After receiving the completion suggestion(s), the electronic device 102 presents the completion suggestion(s) to a user for selection, such as in conjunction with a search. For example, the electronic device 102 may present the completion suggestion(s) using the same interface in which the user began inputting the search term. The electronic device 102 receives user input selecting one of the provided completion suggestions, such as to perform a search (510). When the selection of one of the completion suggestions is received (510), the electronic device 102 determines whether the second or third topic data items provided by the server 108 in association with the completion suggestion are stored in the local topic database 304 of the electronic device 102.

If neither the second nor third topic data items are stored in the local topic database 304 of the electronic device 102 (512), then the selected completion suggestion is sent, without a selected topic data item, from the electronic device 102 to the server 108 (514). The electronic device 102 then receives search results (e.g., a ranked list of search results) from the server 108 (524), where the search results are not based on either of the second or third topic data items. In this instance, the electronic device 102 may transmit the selected completion suggestion with the top N ranked topic data items from the topic database 304 to the server 108, where N is 2, 5, or any number.

If only one of the second or third topic data items is included in the topic database 304 of the electronic device 102 (516), then that topic data item is selected by the electronic device 102 for transmission to the server 108 in conjunction with the selected completion suggestion (520). Using the above examples of "programming" and "animals" as the second and third topic data items, the topic data item of "programming" may be included within the topic data items stored in the topic database 304 of electronic device 102, while the topic data item of "animals" may be not be stored in the topic database 304 of the electronic device 102. Thus, in this instance the electronic device 102 would select the topic data item of "programming."

The selected topic data item and the selected completion suggestion are sent from the electronic device 102 to the server 108 (522). The server 108 may then retrieve one or more search results based at least in part on the selected topic data item and the selected completion suggestion, and provide the one or more search results to the electronic device 102. The electronic device 102 receives the search results (e.g., a ranked list of search results) from the server 108 (524), where the search results are relevant to the user's interests (e.g. "programming").

If both the second or third topic data items are included in the topic database 304 of the electronic device 102 (516), then the higher-ranked topic data item is selected for transmission to the server 108 in conjunction with the selected completion suggestion (518). As noted above, the topic data items stored in the topic database 304 of the electronic device 102 may be ranked based on an expected impact of each of the topic data items on obtaining relevant search results, and/or of an expected impact on improving a search metric. Using the above examples of "programming" and "animals" as the second and third topic data items, both of the topic data items of "programming" and "animals" may be stored in the topic database 304 of the electronic device 102. Thus, the electronic device 102 would select the higher-ranked topic data item, such as, for example, "programming," for transmission to the server 108 in conjunction with the selected completion suggestion.

The higher-ranked topic of the second or third topic data item, and the selected completion suggestion, are sent from the electronic device 102 to the server 108 (522). The server 108 may then retrieve one or more search results based at least in part on the selected topic data item and the selected completion suggestion, and provide the one or more search results to the electronic device 102. The electronic device 102 receives search results (e.g., a ranked list of search results) from the server 108 (524), where the search results are relevant to the user's interests (e.g. "programming").

Thus, the search results received by the electronic device 102 may be based on the selected completion suggestion (e.g. the search term) and the selected topic data item. By coupling the search term with the topic data item, the received ranked list of search results may more closely relate to interests of the user, while maintaining user anonymity.

Figure 6:
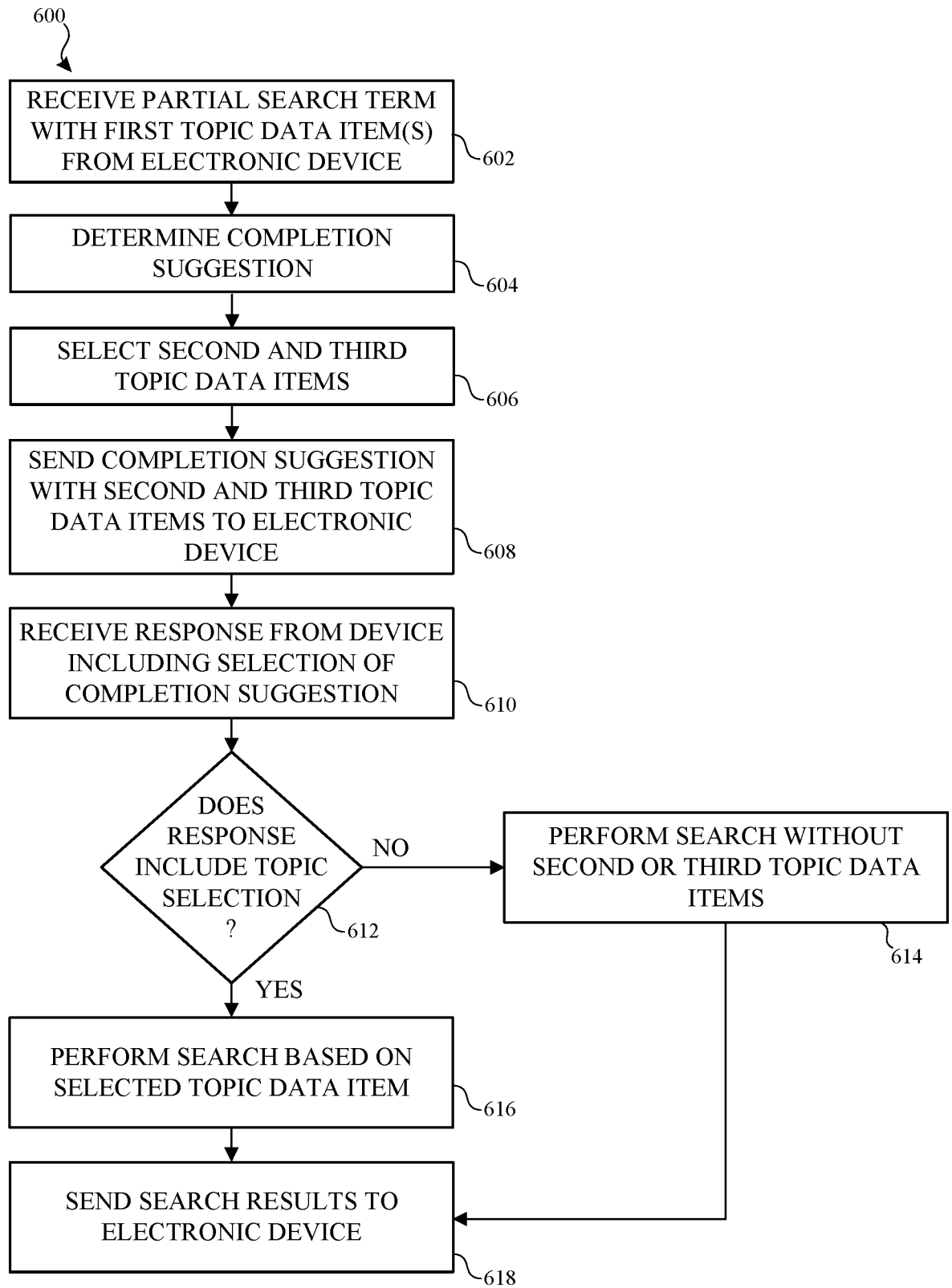
FIG. 6 illustrates a flow diagram of an example process for performing a search based on anonymized user data received from an electronic device in accordance with one or more implementations.

FIG. 6 illustrates a flow diagram of an example process 600 for performing a search based on anonymized user data received from an electronic device in accordance with one or more implementations. For explanatory purposes, the process 600 is primarily described herein with reference to the server 108 of FIG. 1. However, the process 600 is not limited to the server 108 of FIG. 1, and one or more blocks (or operations) of the process 600 may be performed by one or more other components of the server 108 and/or by other suitable devices (e.g., one or more other servers). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The server 108 receives a partial search term, where the user did not complete entry of an entire search term, together with a first topic data item(s) from the electronic device 102 (602). For example, the server 108 may receive the partial search term of "py," based on the user partially entering "python" within a search interface on the electronic device 102. The server 108 may also receive the topic data items of "programming" and "art" from the electronic device 102.

As noted above, the server 108 may store its own copy of the mapping and ranking data structure 308. The server 108 accesses the mapping and ranking data structure 308 to determine a completion suggestion based on the partial search term and the first topic data item(s) when the first topic data item corresponds to a completion suggestion (604). For example, the server 108 may traverse through the tree structure to determine a topic and/or entity, to be used as the completion suggestion, the prefix of which matches the partial search term, and/or the server 108 may determine one or more topics associated with candidate completion suggestions. Using the example of the partial search term "py," the server 108 may rank the completion suggestion of "python" higher than "pyramid," since "python" corresponds to one of the topic data items "programming," and "pyramid" may not correspond to either the topic data items of "programming" and "art" as provided by the electronic device 102. Since the partial search term is coupled with the first topic data item(s), the server 108 can choose a completion suggestion that more closely relates to interests of the user, while maintaining user anonymity.

The server 108 may further traverse the tree structure to select at least two topic data items (hereinafter "second and third topic data items") based on the topic and/or entity corresponding to the completion suggestion (606). For example, the server 108 selects, based on node connections of the topic and/or entity corresponding to the completion suggestion, the second and third topic data items. Thus, the second and third topic data items relate to, but are not the same as, the topic and/or entity of the completion suggestion.

For example, the completion suggestion of "python" and the topic of "programming" may be connected as nodes within the tree structure. In addition, "python" and the topic of "animals" may be connected as nodes within the tree structure. Thus, the server 108 may select the topics of "programming" and "animals" as the second and third topic data items, based on the node connections within the tree structure.

The server 108 then sends, to the electronic device 102, the completion suggestion together with the second and third topic data items (608). While FIG. 6 is described herein with reference to one completion suggestion, it is understood that the server 108 may determine multiple completion suggestions for the partial search term (e.g., "python" and "pyramid" for the partial search term "py," with "python" being ranked higher due to its correspondence with the first topic data item(s)), and then send electronic device 102 a list of the multiple completion suggestions. Each of the multiple completion suggestions may be associated with respective second and third topic data items.

In a case where the server 108 sends the electronic device 102 a list of the multiple completion suggestions (each of which may have respective second or third topic data items), the server 108 may calculate a relevance score for each completion suggestion within the list and transmit the relevance scores together with the list. After receiving the list and corresponding relevance scores, the electronic device 102 may display the completion suggestions for user selection in ranked order, such as based on the relevance scores. For example, the electronic device 102 may display the completion suggestion with the highest relevance score first on the list, and display the completion suggestion with the lowest relevance score last on the list.

The relevance scores for the completion suggestions may be based on one or more factors. For example, as suggested above, the relevance scores may be based at least partially on whether the completion suggestion corresponds to one of the topic data items received from the electronic device 102.

Alternatively or in addition, the relevance score for a completion suggestion may be based at least partially on its popularity within a structured data source (e.g., an online encyclopedia such as Wikipedia). As described above, a completion suggestion may be a topic corresponding to an entry within the structured data source. The popularity of the entry within the structured data source may be used as another factor in calculating the relevance score for the corresponding completion suggestion. In this regard, log data may be generated and maintained in association with user interaction with the structured data source (e.g., across all users). For a particular entry within the structured data source, the log data may indicate one or more of the total number of user visits (e.g., visits to the webpage corresponding to the entry), the frequency of visits, the average duration of visits, and the like. This information in the log data may be used to determine respective popularities for entries corresponding to the completion suggestions. In turn, the respective popularities can be used to determine the relevance scores for the completion suggestions. By virtue of determining the popularities and relevance scores across multiple users (e.g., all users) of the structured data source, it is possible to maintain user anonymity while still providing relevant completion suggestions for partial search terms.

Moreover, a machine learning model may be employed to determine and/or bias relevance scores. The machine learning model may be used alone or in conjunction with the determination of relevance scores as described above. For example, the machine learning model may bias relevance scores which were initially calculated from the respective popularities of completion suggestions within a structured data source. Alternatively, and/or in addition, the partial search term and topic data item(s) provided with the partial search term may be provided as inputs to the machine learning model, and the machine learning model may output a number of candidate completion suggestions along with a score for each of the candidate completion suggestions. Each score may be indicative of a likelihood of the user selecting the corresponding candidate completion suggestion in view of the user's interest in the topic data item(s) provided with the partial search term.

In one or more implementations, the machine learning model is trained with data corresponding to prior user selection (e.g., across all users) of completion suggestions for a partial search term, together with the topic data item(s) provided with the partial search term. For example, each time a completion suggestion is selected by a user (e.g., any user) searching in conjunction with the server 108 (or any other server), the partial search term, the selected completion suggestion, and/or the topic data item(s) provided with the partial search term may be stored, such that the machine learning model can be subsequently trained and/or retrained with the stored data.

In this manner, the machine learning model may be trained to correlate particular completion suggestions with topic data item(s) for a given partial search term, to thereby provide more relevant completion suggestions for partial search terms. Moreover, since the machine learning model is trained with input spanning multiple users (e.g., all users performing searches in conjunction with the server 108 and/or any other server), it is possible to maintain user anonymity.

Thus, the relevance score for completion suggestions can be determined based on one or more factors, including: whether the completion suggestion corresponds to topic data item(s) received from the electronic device 102; the popularity of an entry corresponding to the completion suggestion within a structured data source; and/or output from a machine learning model trained, e.g., using prior user selection of completion suggestions and the topic data item(s) sent with a partial search term. Other factors may be used in determining the relevance score for completion suggestions.

At the electronic device 102, user input selecting one of the completion suggestion(s) is received, such as to perform a search. In addition, one or none of the second and third topic data items are selected at the electronic device 102, based on whether the second and third topic data items are stored in the topic database 304 of the electronic device 102. If both the second and third topic data items are stored in the topic database 304, the electronic device 102 selects one of the one that has a higher ranking (e.g., based on the mapping and ranking data structure 308).

The server 108 receives a response from the electronic device 102, where the response at least includes the selected completion suggestion (610). As noted above, the selected completion suggestion, together with the partial search term and the topic data item(s) (e.g., the first topic data item(s) sent by the electronic device 102), may be used to further train the machine learning model, for improved relevance of future completion suggestions provided by the server 108.

The response may or may not include a selection of one of the second or third topic data items that were provided by the server 108 to the electronic device 102 in conjunction with the completion suggestion. If the response does not include a selection of the second or third topic data item (612), the server 108 performs a search which is not based on either of the second or third topic data items (614).

If the response does include a selection of the second or third topic data items (612), the server 108 performs a search which is based on the selected completion suggestion as well as the selected topic data item (616). By coupling the selected completed suggestion (e.g. the search term) with the selected topic data item, the server may generate a list of search results that more closely relates to interests of the user, while maintaining user anonymity. The server 108 then sends the generated search results to the electronic device 102 (618). In one or more implementations, the search results may be identified and/or scored using a machine learning model, such as in the manner described above with respect to the completion suggestions.

As described above, one aspect of the present technology is the gathering and use of data available from various sources to, for example, improve the delivery to users of content that may be of interest to them. The present disclosure contemplates that in some instances, this gathered data may include personal information data that identifies user activity on an electronic device with respect to a specific person. Such personal information data can include, for example, identification of user interests, demographic data, temporal-based data, location-based data, or other identifying information.

The present disclosure recognizes that the use of such personal information data, in the present technology, can be used to the benefit of users. For example, the personal information data can be used to deliver targeted content that is of greater interest to the user (e.g., providing the user with relevant search results or query suggestions, and the like). Accordingly, use of such personal information data enables discrete control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. As is described herein, the collected personal information is only stored on the user's own devices, with the exception of temporarily caching some data on a server for transport purposes.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select not to provide temporal or location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publically available information.

Figure 7:
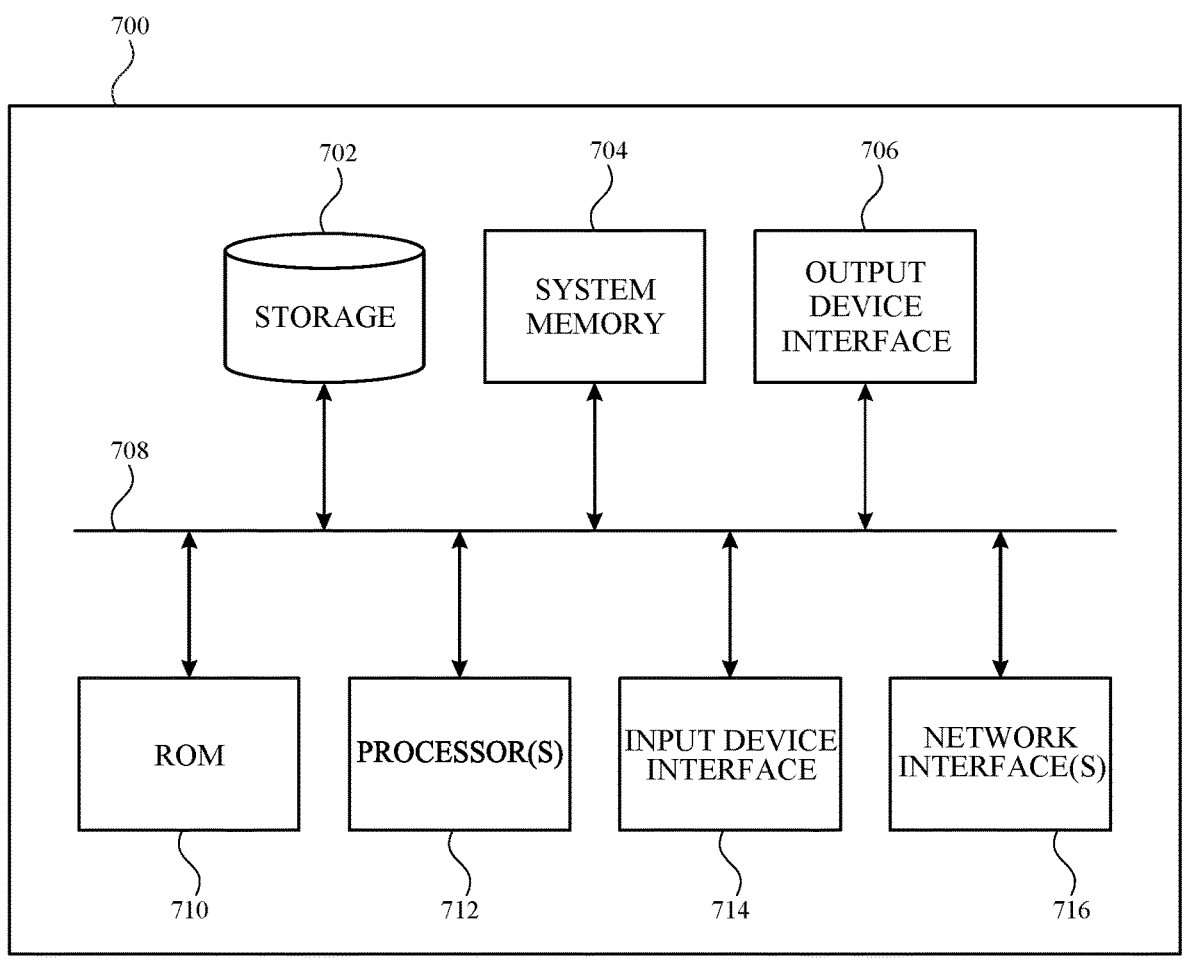
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, one or more of the electronic devices 102-104, and/or one or the server 108 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 102 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   at least one processor configured to:
      receive user input comprising a search term, wherein a first and a second data structure are stored on the device, the first data structure comprising user interest data items that correspond to prior user activity, and the second data structure comprising topic data items derived from the user interest data items, wherein the prior user activity corresponds to prior user interactions with a plurality of applications on the device and to other prior user interactions on at least one other device;
      access, in response to receiving the user input, the second data structure to obtain one of the topic data items;
      transmit, to a server, the search term and the one of the topic data items for obtaining at least one of a query suggestion or a search result, wherein a user account associated with the device is not identifiable from the one of the topic data items; and
      receive, from the server, the at least one of the query suggestion or the search result, the at least one of the query suggestion or the search result having been obtained based at least in part on the search term and the one of the topic data items.

2. The device of claim 1, wherein the search term comprises a partial search term and the query suggestion comprises a completion suggestion for the partial search term.

3. The device of claim 1, wherein the prior user activity on the device corresponds to prior user interactions with a plurality of applications on the device, the first data structure being continuously updated based on subsequent user interactions.

4. The device of claim 1, wherein the device and the at least one other device are associated with a shared user account, and the first data structure is continuously updated based on subsequent user interactions.

5. The device of claim 1, wherein the second data structure is defined prior to receiving the user input, based on a predefined mapping of the user interest data items to the topic data items.

6. The device of claim 1, wherein the topic data items are ranked based on an expected impact of each of the topic data items on obtaining relevant search results.

7. The device of claim 1, wherein each topic data item, within the second data structure, corresponds to a user interest shared by at least a threshold number of users.

8. The device of claim 1, wherein the user input is received within a browser application, a desktop search application or an intelligent personal assistant application.

9. A method comprising:
   receiving, by a device, user input comprising a search term, wherein a first and a second data structure are stored on a device, the first data structure comprising user interest data items that correspond to prior user activity, and the second data structure comprising topic data items derived from the user interest data items, wherein the prior user activity corresponds to prior user interactions with a plurality of applications on the device and to other prior user interactions on at least one other device;

accessing, in response to receiving the user input, the second data structure to obtain one of the topic data items;

transmitting, to a server, the search term and the one of the topic data items for obtaining at least one of a query suggestion or a search result, wherein a user associated with the user input is not identifiable from the one of the topic data items; and receiving, from the server, the at least one of the query suggestion or the search result, the at least one of the query suggestion or the search result having been obtained based at least in part on the search term and the one of the topic data items.

10. The method of claim 9, wherein the search term comprises a partial search term and the query suggestion comprises a completion suggestion for the partial search term.

11. The method of claim 9, wherein the prior user activity on the device corresponds to prior user interactions with a plurality of applications on the device, the first data structure being continuously updated based on subsequent user interactions.

12. The method of claim 9, wherein the device and the at least one other device are associated with a shared user account, and the first data structure is continuously updated based on subsequent user interactions.

13. The method of claim 9, wherein the second data structure is defined prior to receiving the user input, based on a predefined mapping of the user interest data items to the topic data items.

14. The method of claim 9, wherein the topic data items are ranked based on an expected impact of each of the topic data items on obtaining relevant search results.

15. The method of claim 9, wherein each topic data item, within the second data structure, corresponds to a user interest shared by at least a threshold number of users.

16. The method of claim 9, wherein the user input is received within a browser application, a desktop search application or an intelligent personal assistant application.

17. A computer program product comprising code stored on a non-transitory machine-readable medium, the code comprising:

code to receive, by a device, user input comprising a search term, wherein a first and a second data structure are stored on a device, the first data structure comprising user interest data items that correspond to prior user activity, and the second data structure comprising topic data items derived from the user interest data items, wherein the prior user activity corresponds to prior user interactions with a plurality of applications on the device and to other prior user interactions on at least one other device;

code to access, in response to receiving the user input, the second data structure to obtain one of the topic data items;

code to transmit, to a server, the search term and the one of the topic data items for obtaining at least one of a query suggestion or a search result wherein a user account associated with the device is not identifiable from the one of the topic data items; and code to receive, from the server, the at least one of the query suggestion or the search result, the at least one of the query suggestion or the search result having been obtained based at least in part on the search term and the one of the topic data items.

18. The computer program product of claim 17, wherein the search term comprises a partial search term and the query suggestion comprises a completion suggestion for the partial search term.

19. The computer program product of claim 17, wherein the prior user activity on the device corresponds to prior user interactions with a plurality of applications on the device, the first data structure being continuously updated based on subsequent user interactions.

20. The computer program product of claim 17, wherein the device and the at least one other device are associated with a shared user account, and the first data structure is continuously updated based on subsequent user interactions.

* * * * *